United States Patent
Sun et al.

(10) Patent No.: US 11,296,644 B2
(45) Date of Patent: Apr. 5, 2022

(54) ALTERNATING PASSIVE RECTIFICATION AND 3-PHASE-SHORT CONTROL FOR MOTOR FAULT PROTECTION

(71) Applicant: Ford Global Technologies, LLC, Dearborn, MI (US)

(72) Inventors: Xuemei Sun, Canton, MI (US); Jiyao Wang, Canton, MI (US); Hongjie Wu, Canton, MI (US); William Reynolds, Tecumseh (CA); Silong Li, Canton, MI (US); Michael W. Degner, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/747,418

(22) Filed: Jan. 20, 2020

(65) Prior Publication Data

US 2021/0226570 A1   Jul. 22, 2021

(51) Int. Cl.
  *H02P 29/024*   (2016.01)
  *H02M 7/5387*   (2007.01)
  *H02P 27/08*    (2006.01)

(52) U.S. Cl.
  CPC ...... *H02P 29/024* (2013.01); *H02M 7/53871* (2013.01); *H02P 27/08* (2013.01)

(58) Field of Classification Search
  CPC .... H02P 29/024; H02P 27/08; H02M 7/53871
  See application file for complete search history.

(56) References Cited

U.S. PATENT DOCUMENTS

| | | | | |
|---|---|---|---|---|
| 6,683,435 | B1* | 1/2004 | Liang | B60L 3/0023 |
| | | | | 318/400.01 |
| 6,949,908 | B2* | 9/2005 | Maslov | H02P 29/02 |
| | | | | 318/727 |
| 2009/0230901 | A1* | 9/2009 | Amano | B60L 15/007 |
| | | | | 318/400.3 |
| 2013/0141027 | A1* | 6/2013 | Nakata | H02P 27/08 |
| | | | | 318/400.23 |
| 2013/0187588 | A1* | 7/2013 | Nakata | H02P 27/06 |
| | | | | 318/430 |

FOREIGN PATENT DOCUMENTS

| | | |
|---|---|---|
| CN | 100380781 C | 4/2008 |
| JP | H08140202 A | 5/1996 |

* cited by examiner

*Primary Examiner* — Muhammad S Islam
*Assistant Examiner* — Devon A Joseph
(74) *Attorney, Agent, or Firm* — David B. Kelley; Brooks Kushman P.C.

(57) ABSTRACT

A vehicle includes a traction battery, an inverter, and a controller. The inverter includes a plurality of pairs of switches. Each of the pairs includes an upper switch that is directly electrically connected with a positive terminal of the traction battery and a lower switch that is directly electrically connected with a negative terminal of the traction battery. The controller, responsive to presence of a fault condition and during each of consecutive switching periods, deactivates all of the switches for a predetermined portion of the switching period, activates only the upper switches for another predetermined portion of the switching period, deactivates all of the switches for yet another predetermined portion of the switching period, and activates only the lower switches for still yet another predetermined portion of the switching period.

14 Claims, 5 Drawing Sheets

ALTERNATING PASSIVE RECTIFICATION AND 3-PHASE-SHORT CONTROL FOR MOTOR FAULT PROTECTION

TECHNICAL FIELD

This disclosure relates to power systems for battery electric vehicles or plug-in hybrid electric vehicles.

BACKGROUND

In hybrid electric vehicles or battery electric vehicles, the high voltage battery serves as an energy source to a traction motor, which drives the wheels and consumes battery energy, or generates power from the wheels and charges the battery. For high precision control of the traction motor, space vector pulse width modulation is commonly used. This strategy typically requires motor rotor position, DC bus voltage, and phase current measurements.

SUMMARY

A vehicle includes a traction battery, an electric motor, an inverter, and a controller. The inverter transfers power between the traction battery and electric motor. The inverter includes a plurality of pairs of switches. Each of the pairs includes an upper switch that is directly electrically connected with a positive terminal of the traction battery and a lower switch that is directly electrically connected with a negative terminal of the traction battery. The controller, responsive to presence of a fault condition and during each of consecutive switching periods, deactivates all of the switches for a predetermined portion of the switching period, activates only the upper switches for another predetermined portion of the switching period, deactivates all of the switches for yet another predetermined portion of the switching period, and activates only the lower switches for still yet another predetermined portion of the switching period such that the predetermined portion of the switching period and the yet another predetermined portion of the switching period are not consecutive.

A vehicle includes a traction battery, an electric motor, and an inverter that transfers power between the traction battery and electric motor. The inverter includes a plurality of pairs of switches. Each of the pairs includes an upper switch that is directly electrically connected with a positive terminal of the traction battery and a lower switch that is directly electrically connected with a negative terminal of the traction battery. The vehicle also includes a controller that, responsive to presence of a fault condition and during each of consecutive switching periods, deactivates all of the switches for a predetermined portion of the switching period and activates only the lower switches for a remaining portion of the switching period.

A vehicle includes a traction battery, an electric motor, and an inverter that transfers power between the traction battery and electric motor. The inverter includes a plurality of pairs of switches. Each of the pairs includes an upper switch that is directly electrically connected with a positive terminal of the traction battery and a lower switch that is directly electrically connected with a negative terminal of the traction battery. The vehicle also includes a controller that, responsive to presence of a fault condition and during each of consecutive switching periods, deactivates all of the switches for a predetermined portion of the switching period and activates only the upper switches for a remaining portion of the switching period.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Under fault conditions such as a three phase current sensor fault, a traction motor controller executing space vector pulse width modulation could become unstable, resulting in large phase current and DC bus voltage oscillation. Common responses to fault conditions include so-called "all-IGBT-off" and "fixed 3-phase short" strategies. As discussed below, the all-IGBT-off method can protect the traction motor, but it increases DC bus voltage, which may affect components on the DC bus, such as the traction battery, battery sensing circuitry, DC capacitor, or motor inverter. The fixed 3-phase short method does not result in DC bus over-voltage, but it may create large transient negative Id current and could lead to demagnetization of the traction motor's permanent magnet.

Here, an innovative is proposed. This method, in one example, turns on all upper insulated gate bipolar transistors (IGBTs) in half switching cycle and lower ones in the other half switching cycle. During transitions between upper and lower cycles, an intentionally longer (than normal operation) dead time may be inserted. By properly choosing the combination of switching frequency and dead time length, a balance point between all-IGBT-off and fixed 3-phase short can be achieved. Consequently, the DC bus voltage does not rise high enough to affect other components and transient Id currents do not demagnetize the traction motor's permanent magnet.

Traditional Motor Fault Protection

All-IGBT-Off

Figure 1:
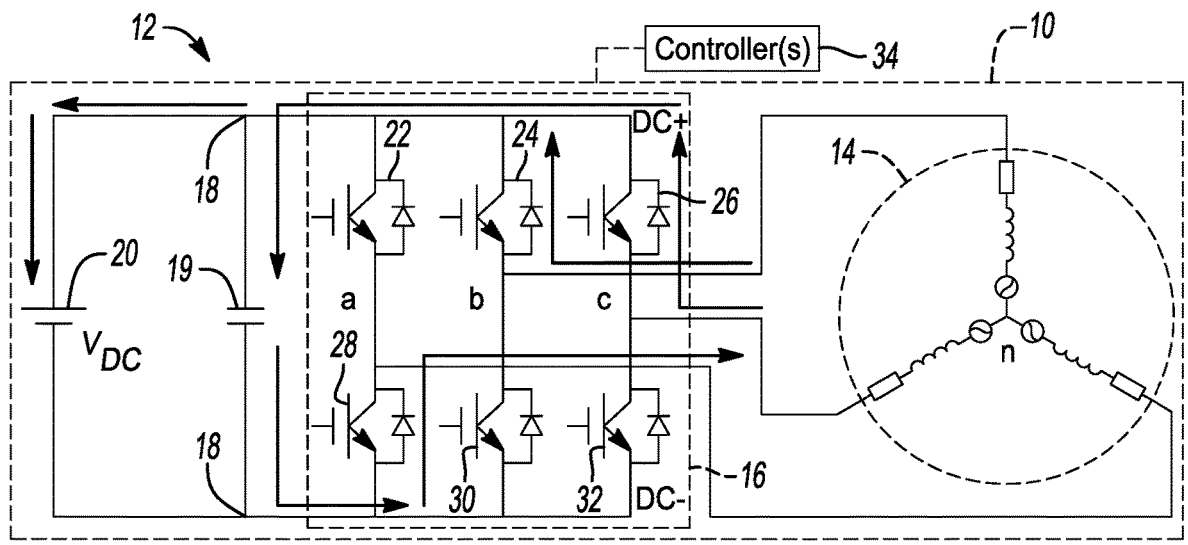
FIG. 1 is a schematic diagram of an inverter control system showing an example of phase current flow during all-IGBT-off control.

FIG. 1 illustrates a power system 10 of a vehicle 12. The power system 10 includes a traction motor (electric machine) 14, an inverter 16, a DC bus 18, an input capacitor 19, and a traction battery 20. The inverter 16 includes a plurality of switches (e.g., IGBTs) 22, 24, 26, 28, 30, 32. The switches 22, 24, 26 are directly electrically connected with a positive terminal of the traction battery 20. The switches 28, 30, 32 are directly electrically connected with a negative terminal of the traction battery 20. Moreover, the switches 22, 28 define a pair, the switches 24, 30 define pair, and the switches 26, 32 define a pair. Each of the pairs service one of the phases (e.g., phase a, phase b, phase c) of the traction motor 14. The power system also includes a controller 34 in communication with the power system 10 such that the controller may receive data regarding operation of the components thereof and issue control commands thereto. During normal operation of the traction motor 14, for example, the controller 34 operates each of the pairs in complimentary fashion as known in the art.

If the controller 34 activates the all-IGBT-off strategy, the switches 22, 24, 26, 28, 30, 32 are deactivated and the motor phase current flows through the IGBT parallel diodes as shown. This may lead to circulation current flowing into the DC bus 18 and traction battery 20, i.e., an energy pump into the DC bus 18. For this particular example, phase-a current flows toward the traction motor 14 and the other two phase currents flow out of the traction motor 14.

Regardless of the motor pre-fault condition, as soon as the controller 34 activates the all-IGBT-off strategy, the motor winding current will immediately start to pump energy back to the DC bus 18. This energy pump can be intensive because the circulation charging current is equal to the faulted motor winding current. Additionally, it can start suddenly. Depending on the size of the input capacitor 19 and the amount of fault energy stored in the motor winding, the DC bus voltage could jump to a high value, which could affect components connected therewith.

Fixed 3-Phase Short

Figure 2A:
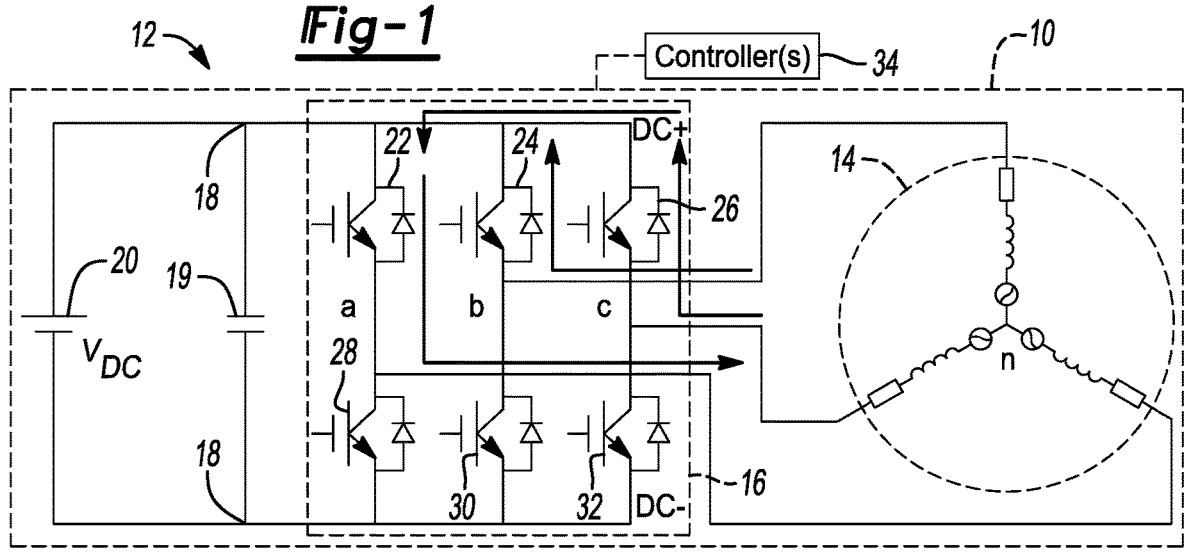
FIGS. 2A and 2B are schematic diagrams of an inverter control system showing an example of phase current flow during 3-phase short control when Ia flows into the traction motor and Ib and Ic flow out of the traction motor.
Figure 2B:
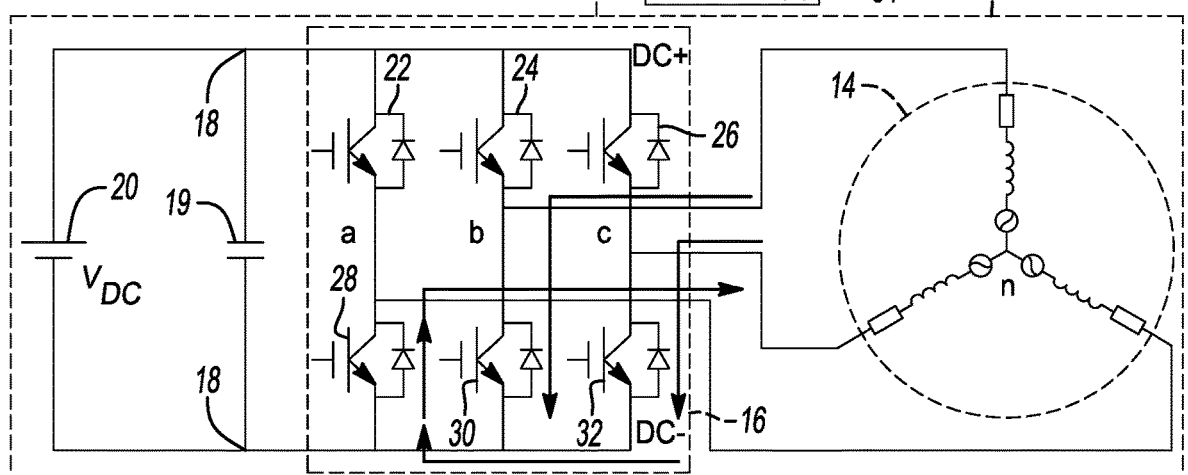

FIGS. 2A and 2B also illustrate the power system 10. (For ease of understanding, the various control techniques will be explained with reference to the same power system.) If the controller 34 activates the fixed 3-phase short strategy, the 3-phase cables are either shorted to the DC+ terminal by activating the switches 22, 24, 26 and deactivating the switches 28, 30, 32 (FIG. 2A), or shorted to the DC− terminal by deactivating the switches 22, 24, 26 and activating the switches 28, 30, 32 (FIG. 2B). As the current circulates between the traction motor 14 and the switches 22, 24, 26, or 28, 30 32, there is no DC bus current circulation, and thus no voltage jump on the DC bus. This strategy, however, can create a short circuit on motor terminals. A spinning motor with short circuits may experience large transient 3-phase currents, which can demagnetize the permanent magnet.

Proposed Motor Fault Protection

Alternating Passive Rectification and 3-Phase Short

Figure 3:
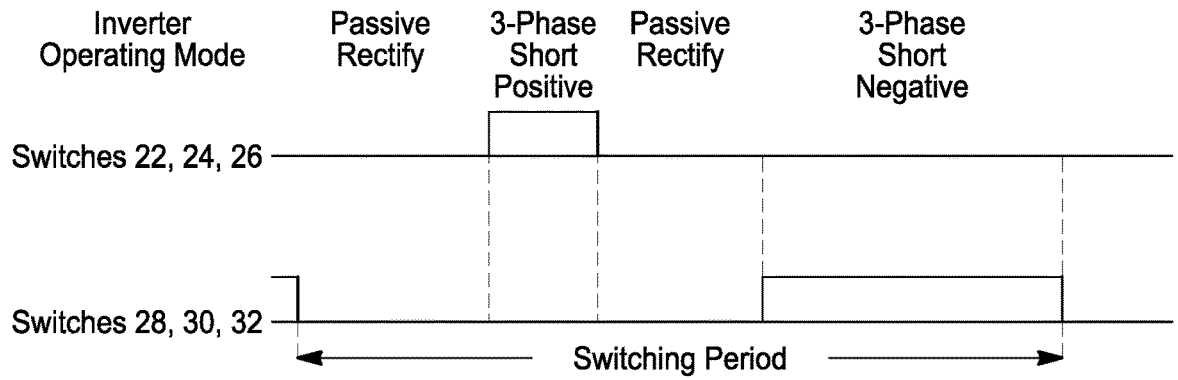
FIG. 3 is an operating state diagram for an inverter during alternating passive rectification and 3-phase short control.

FIG. 3 illustrates alternating passive rectification and 3-phase short control and its operating modes. During '3-Phase Short Positive' (or '3-Phase Short Negative') mode, the controller 34 activates all the upper switches 22, 24, 26 (or the lower switches 28, 30, 32) at the same time and with the same duration. During 'Passive Rectify' mode, all the switches 22, 24, 26, 28, 30, 32 are deactivated. To avoid switch shoot-through faults, the 'Passive Rectify' mode is located between the '3-Phase Short Positive' and '3-Phase Short Negative' modes: It appears twice in non-consecutive fashion within one switching period.

The motor phase current flow during '3-Phase Short Positive' and '3 Phase Short Negative' modes is the same as the 3-phase short method (FIGS. 2A and 2B), and motor energy is consumed within the traction motor 14 and inverter 16. The motor phase current flow during 'Passive Rectify' mode is the same as the all-IGBT-off method (FIG. 1), and motor energy is passively rectified to the DC bus 18. Therefore, the PassiveRectifyRatio, defined in the equation below, determines the motor energy distribution between the traction motor 14 and DC 18 bus.

PassiveRectifyRatio (%)=
(ΣPassiveRecificationDuration per Switching
Period/Switching Period)*100

As an illustration, the table below shows PassiveRectifyRatio using pulse width modulation (PWM) control with 50% duty cycle, specified switching period, and various dead times.

| Switching Frequency (kHz) | Switching Period (us) | Dead Time (us) | PassiveRecifyRatio (%) |
|---|---|---|---|
| 18 | 55.6 | 20 | 72 |
|  |  | 15 | 54 |
|  |  | 10 | 36 |
|  |  | 5 | 18 |

The benefit of the proposed method can be illustrated with a PassiveRecifyRatio of 54% as an example. With the conventional all-IGBT-off method, all the energy stored in the traction motor is regulated to the DC bus at one time, while the proposed method divides the total energy into small portions and sends 27% of the portion to the DC bus during passive rectify mode—thus reducing the DC bus voltage increment. With the conventional 3-phase short method, all the energy stored in the traction motor is consumed inside the motor, while the proposed method allows the motor to consume 23% of the energy portion during 3-Phase Short Positive or 3-Phase Short Negative modes—thus reducing Id peak current and avoiding motor demanganization.

Other Cases

Figure 4:
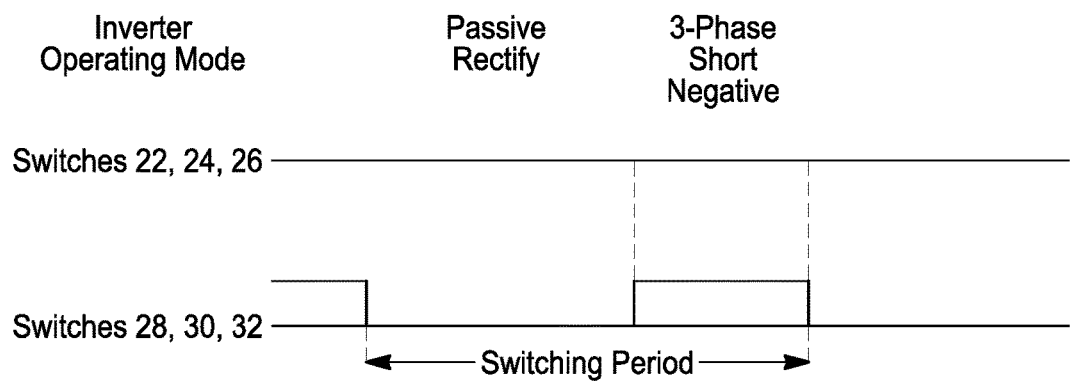
FIG. 4 is an operating state diagram for an inverter during alternating passive rectification and 3-phase short control with all upper switches full off.
Figure 5:
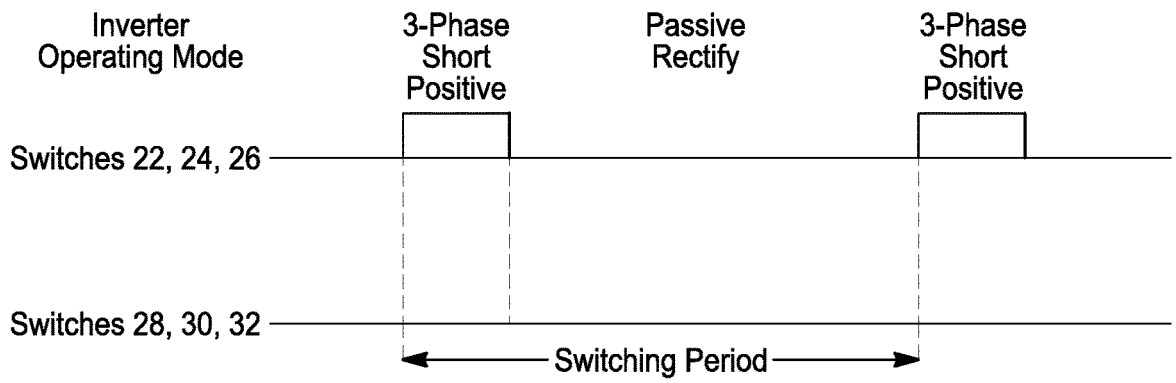
FIG. 5 is a state diagram for an inverter during alternating passive rectification and 3-phase short control with all lower switches full off.

The alternating passive rectification and 3-phase short control has two other cases containing 'Passive Rectify' and '3-Phase Short Negative' (or '3-Phase Short Positive') mode, as shown in FIGS. 4 and 5 in which either the upper switches 22, 24, 26 or the lower switches 28, 30, 32 are deactivated during the entire switching period. Choice of implementation among the various cases may depend on whether PWM control or digital control (see below) is used. The alternating passive rectification and 3-phase short control, for example, may be easier to implement with PWM control. The other cases may be easier to implement with digital control, etc.

Degree of Control Freedom

Passive Rectify Duration

For a given motor phase current, PassiveRectifyDuration determines the amount of charge, Q, sent to the DC bus 18, and hence the voltage increment on the DC bus components.

$$Q=I\_c*\text{PassiveRectifyDuration}$$

I_c is the motor phase current flowing into the DC bus 18, which is assumed to be constant during the short passive rectification duration. ΔVdc defines the maximum voltage jump on the inverter input capacitor, C, assuming all the accumulated charge, Q, is used to cause the voltage increment.

$$\Delta Vdc=Q/C$$

The battery current, I_Batt, is calculated below.

$$I\_Batt=\Delta Vdc/R\_batt$$

R_batt is the lumped resistance including battery internal resistance, high voltage cable resistance, and cell bus bar resistance. Because of the short passive rectification duration, ΔVdc and I_Batt are reduced significantly compared to the 3-phase short method, and hence reduce battery SoC or pack voltage increment.

Passive Rectify Ratio

The passive rectify ratio determines the motor energy distribution between the traction motor 14 and DC bus 18, and is a variable affecting motor transient Id peak current as explained above. For a given passive rectification duration, a small alternating period (or large alternating frequency) increases the passive rectify ratio and hence reduces transient Id peak current.

In summary, a smaller passive rectify duration is good for DC bus component protection, and a larger passive rectify ratio is good for motor permanent magnet protection. If the alternating frequency is selected to achieve the desired CPU load (i.e., percentage of microprocessor execution time vs idle time), the passive rectify duration is the single degree of control freedom. The passive rectify duration can be designed as a simple calibration constant for control simplicity, or as a function of alternating control elapse time for better control performance.

Alternating Passive Rectification and 3-Phase Short Control Design

For simplicity, alternating passive rectification and 3-phase short control is referred to as alternating control below. Responsive to detection of a traction motor fault, such as data indicating a motor position sensor fault, alternating control can be executed. After motor phase current reaches steady state, the control routine is complete and the traction motor 14 can either be disabled or re-enabled.

Figure 6:
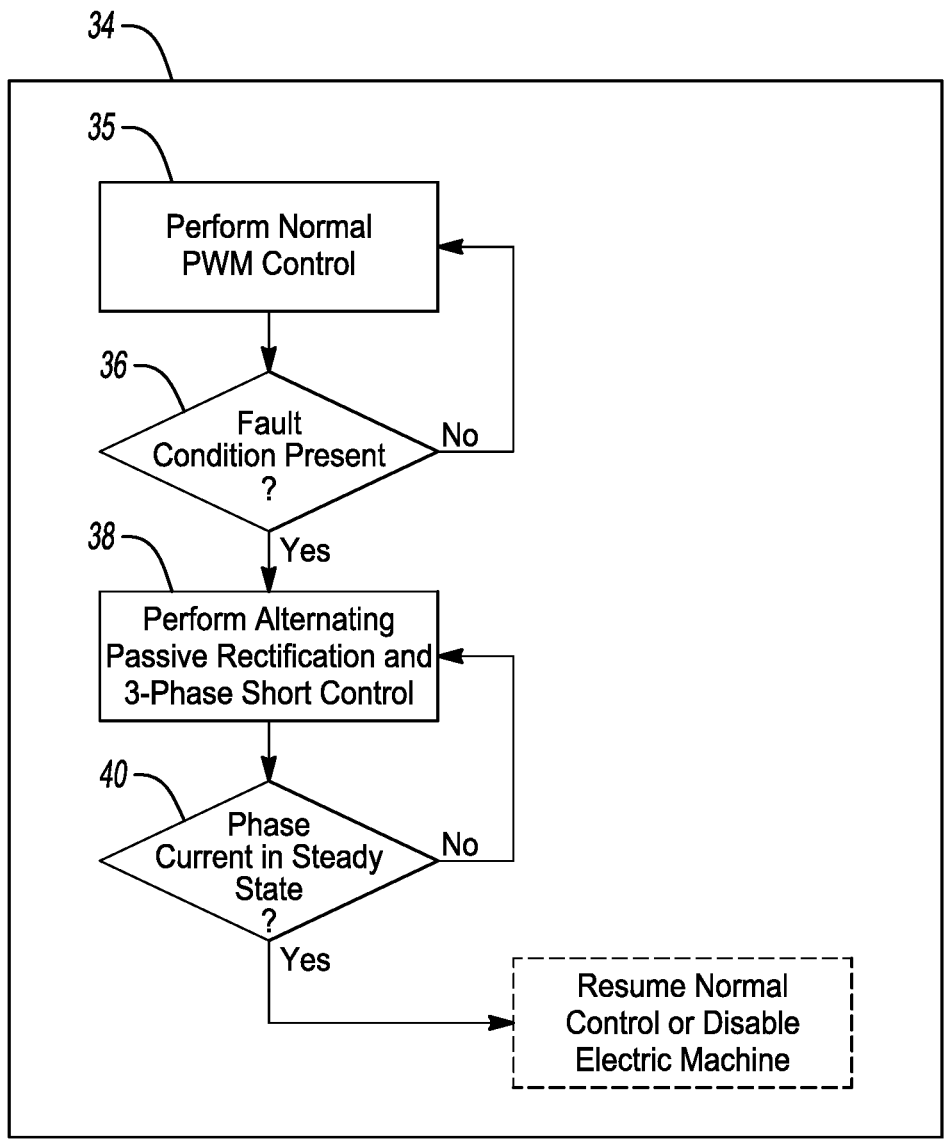
FIG. 6 is a flow chart of an algorithm for entering and exiting alternating passive rectification and 3-phase short control.
Figure 7:
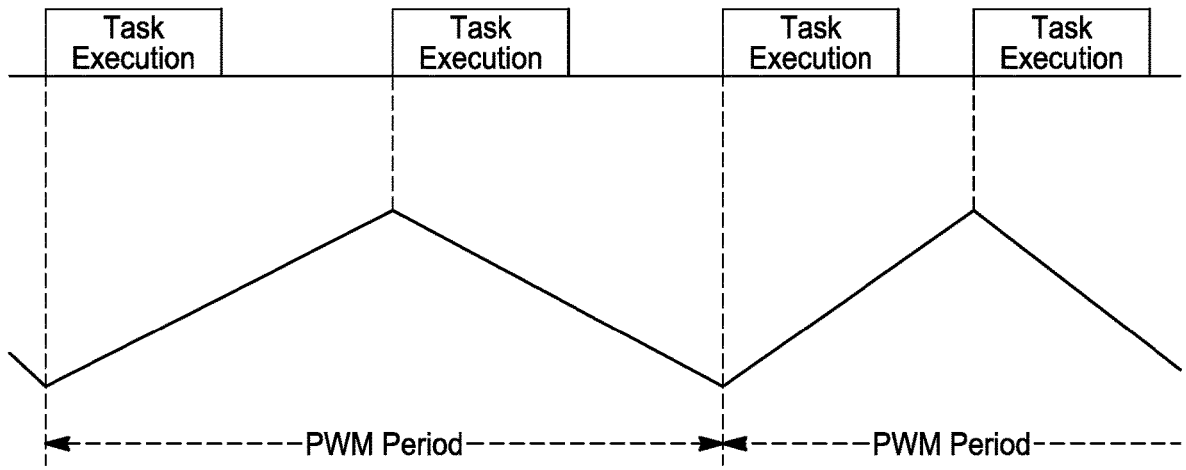
FIG. 7 is an operating state diagram for pulse width modulation (PWM) interrupt service routine execution.

FIG. 6 shows the controller 34 implementing the alternating control algorithm briefly discussed above. At operation 35, the controller is in normal operation, where the motor inverter switches are controlled by PWM output signals and a PWM interrupt is configured to trigger at every half period, as illustrated in FIG. 7. During the PWM interrupt routine, the application software sets the PWM period, duty cycle, and dead time, and the microprocessor or driver updates the PWM duty cycle and dead time in the next half cycle, and the PWM period in the next period. At operation 36, the controller 34 determines whether a fault condition is present. The controller 34, for example, may check for presence of status flags that are set in known fashion responsive to sensor data (e.g., phase current sensor data, voltage sensor data, motor position data, etc.) being absent or having values outside the norm. Other known techniques, however, may also be used to determine whether a fault condition is present. If no, the controller 34 continues to check whether a fault condition is present. If yes, the controller 34 at operation 38 performs the alternating passive rectification and 3-phase short control as contemplated herein and as detailed in FIG. 8 or 9. At operation 40, the controller 34 determines whether phase current has achieved steady state. The controller 34, for example, may check Id for changes in value greater than 10% during a predefined duration of time. Other known techniques, however, may also be used to determine whether phase current has achieved steady state. If no, the controller 34 continues to perform the alternating passive rectification and 3-phase short control. If yes, the controller 34 may resume normal traction motor operation (e.g., complimentary control of the switch pairs as mentioned above) or disable the traction motor 14.

Alternating Control Design with PWM Control

Figure 8:
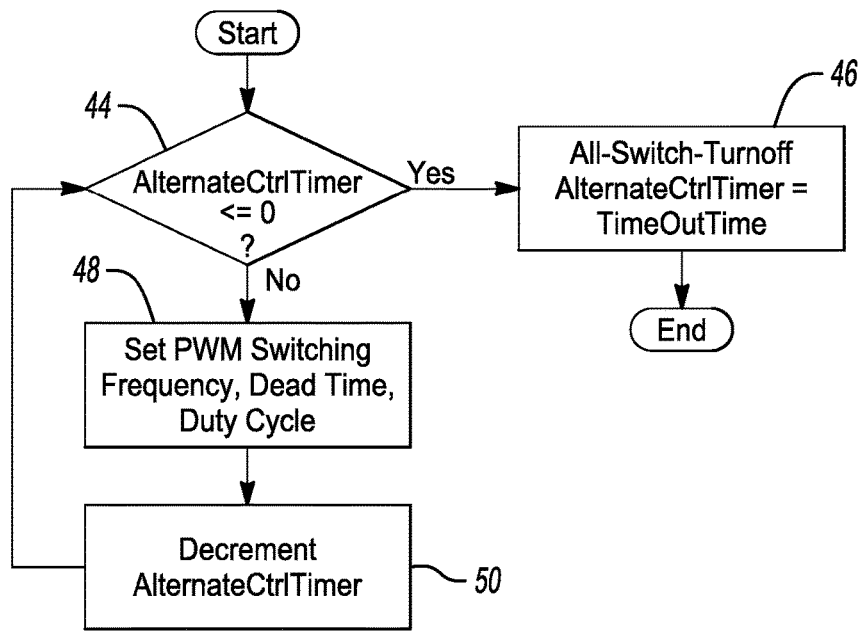
FIG. 8 is a flow chart of an algorithm for alternating passive rectification and 3-phase short control using PWM control.

FIG. 8 illustrates alternating control with PWM control, where alternating frequency, 3-phase-short duration, and passive rectification duration are implemented using PWM switching frequency, switching duty cycle, and dead time, respectively. The control is executed in the PWM interrupt service routine. When activated, it updates the PWM switching frequency and the upper switches' duty cycle and dead time. When the predefined TimeOutTime is reached, the control routine is complete and all the switches are turned off.

The TimeOutTime is a calibrated to ensure motor phase current reaches steady state. It equals L/R, where L is motor phase inductance and R is phase resistance. AlternateCtrlTimer is set to TimeOutTime during power up reset and alternating control exit.

The control design assumes the lower switches have a duty cycle complimentary to their corresponding upper ones. That is, the sum of the upper and lower duty cycle is one, and the dead time at the rising edge of the upper and lower switch are the same.

At operation 44, it is determined whether the AlternateCtrlTimer is less than or equal to zero. If yes, the All-IGBT-Turnoff is executed and AlternateCtrlTimer is set equal to the TimeOutTime at operation 46. If no, the PWM switching frequency, dead time, and duty cycle are set at operation 48. The AlternateCtrlTimer is then decremented at operation 50. The algorithm then returns to operation 44.

Alternating Control Design with Digital Control

Figure 9:
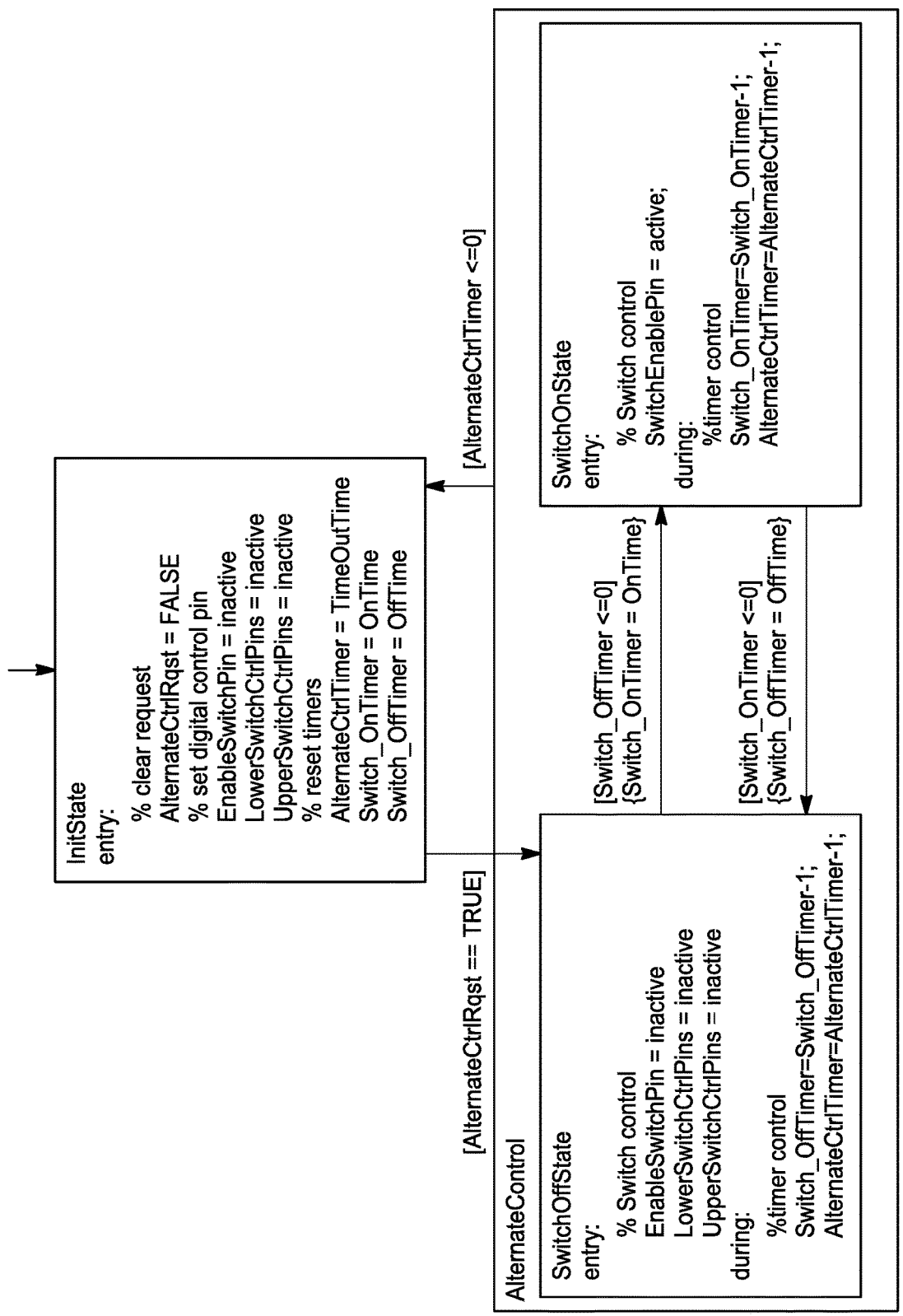
FIG. 9 is a state diagram for alternating passive rectification and 3-phase short control using digital output control.

Alternating control can be implemented with digital output control as well, as illustrated in FIG. 9. The control contains 'Passive Rectify' and '3-Phase Short Positive' for design simplicity. With minor modification, alternating control with 'Passive Rectify' and '3-Phase Short Negative' modes can be achieved.

InitState is entered during power up reset, and control variables and timers of the switches 22, 24, 26, 28, 30, 32 are initialized. When AlternateCtrlRqst is set true by a fault diagnostic feature, SwitchOff state is first entered. During this state, passive rectification duration is achieved by deactivating all the switches 22, 24, 26, 28, 30, 32 for OffTime duration. After OffTime elapses, SwitchOn state is entered. This state is used to implement 3-phase short duration by activating all the upper switches 22, 24, 26 for OnTime duration. The alternating period equals OffTime plus OnTime. Alternating control is complete after TimeOutTime duration expires and all the switches 22, 24, 26, 28, 30, 32 are deactivated at exit.

Alternating passive rectification and 3-phase short control is proposed for motor fault management, which contains 'Passive Rectify' and '3-Phase Short Positive' and '3-Phase Short Negative' modes for the generalized case, and 'Passive Rectify' and either the '3-Phase Short Positive' or '3-Phase Short Negative' modes for special cases. The passive rectification duration determines motor inverter voltage jump, traction battery in-rush peak current, and state of charge increment. The passive rectification ratio determines the motor transient Id peak current. By properly selecting the passive rectify duration and ratio, the control strategy can effectively distribute the stored energy in the motor windings during fault conditions.

The processes, methods, or algorithms disclosed herein may be deliverable to or implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

The words used in the specification are words of description rather than limitation, and it is understood that various changes may be made without departing from the spirit and scope of the disclosure. The control designs discussed above, for example, illustrate examples associated with the concepts captured in FIGS. 3, 4, and 5 and do not necessarily illustrate all possible implementations and variations.

As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a traction battery;
   an electric motor;
   an inverter configured to transfer power between the traction battery and electric motor, wherein the inverter includes a plurality of pairs of switches, wherein each of the pairs includes an upper switch that is directly electrically connected with a positive terminal of the traction battery and a lower switch that is directly electrically connected with a negative terminal of the traction battery; and
   a controller configured to sequentially, responsive to presence of a fault condition and during each of consecutive switching periods that are defined by a switching frequency of the plurality of pairs,
      deactivate all of the switches for a predetermined portion of the switching period,
      activate only the upper switches for another predetermined portion of the switching period,
      deactivate all of the switches for yet another predetermined portion of the switching period,
      activate only the lower switches for still yet another predetermined portion of the switching period such that the predetermined portion of the switching period and the yet another predetermined portion of the switching period are not consecutive, and
      disable the electric motor after the consecutive switching periods.

2. The vehicle of claim 1, wherein the controller is further configured to operate the pairs in complimentary fashion after the consecutive switching periods.

3. The vehicle of claim 1, wherein the fault condition is defined by sensor data.

4. The vehicle of claim 3, wherein the sensor data is motor position sensor data.

5. The vehicle of claim 3, wherein the sensor data is phase current sensor data.

6. A vehicle comprising:
   a traction battery;
   an electric motor;
   an inverter configured to transfer power between the traction battery and electric motor, wherein the inverter includes a plurality of pairs of switches, wherein each of the pairs includes an upper switch that is directly electrically connected with a positive terminal of the traction battery and a lower switch that is directly electrically connected with a negative terminal of the traction battery; and
   a controller configured to, responsive to presence of a fault condition and during each of consecutive switching periods that are defined by a switching frequency of the plurality of pairs, deactivate all of the switches for a predetermined portion of the switching period and activate only the upper switches or only the lower switches for a remaining portion of the switching period, and operate the pairs in complimentary fashion after the consecutive switching periods.

7. The vehicle of claim 6, wherein the controller is further configured to disable the electric motor after the consecutive switching periods.

8. The vehicle of claim 6, wherein the fault condition is defined by sensor data.

9. The vehicle of claim 8, wherein the sensor data is motor position sensor data.

10. The vehicle of claim 8, wherein the sensor data is phase current sensor data.

11. A vehicle comprising:
    a traction battery;
    an electric motor;
    an inverter configured to transfer power between the traction battery and electric motor, wherein the inverter includes a plurality of pairs of switches, wherein each of the pairs includes an upper switch that is directly electrically connected with a positive terminal of the traction battery and a lower switch that is directly electrically connected with a negative terminal of the traction battery; and a controller configured to sequentially, responsive to presence of a fault condition and during each of consecutive switching periods that are defined by a switching frequency of the plurality of pairs, deactivate all of the switches for a predetermined portion of the switching period, activate only the lower switches for another predetermined portion of the switching period, deactivate all of the switches for yet another predetermined portion of the switching period, activate only the upper switches for still yet another predetermined portion of the switching period such that the predetermined portion of the switching period and the yet another predetermined portion of the switching period are not consecutive, and disable the electric motor after the consecutive switching periods.

12. The vehicle of claim 11, wherein the controller is further configured to operate the pairs in complimentary fashion after the consecutive switching periods.

13. The vehicle of claim 11, wherein the fault condition is defined by sensor data.

14. The vehicle of claim 13, wherein the sensor data is motor position sensor data and phase current sensor data.

* * * * *